US011843668B2

(12) United States Patent
Alex et al.

(10) Patent No.: US 11,843,668 B2
(45) Date of Patent: *Dec. 12, 2023

(54) COORDINATION AMONG ARTIFICIAL REALITY LINKS

(71) Applicant: Meta Platforms Technologies, LLC, Menlo Park, CA (US)

(72) Inventors: Sam Padinjaremannil Alex, Dublin, CA (US); Nabeel Ahmed, San Jose, CA (US); William Louis Abbott, Portola Valley, CA (US); Fabrizio Guerrieri, Santa Clara, CA (US); Payam Torab Jahromi, Laguna Niguel, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,321

(22) Filed: Feb. 15, 2022

(65) Prior Publication Data
US 2022/0247837 A1    Aug. 4, 2022

Related U.S. Application Data

(63) Continuation of application No. 16/935,983, filed on Jul. 22, 2020, now Pat. No. 11,252,262.
(Continued)

(51) Int. Cl.
*H04L 67/131* (2022.01)
*H04W 74/08* (2009.01)
(Continued)

(52) U.S. Cl.
CPC .............. *H04L 67/131* (2022.05); *G06T 1/20* (2013.01); *H04L 41/5003* (2013.01);
(Continued)

(58) Field of Classification Search
CPC ..... H04L 67/131; H04L 41/5003; G06T 1/20; G06T 19/006; H04W 24/08;
(Continued)

(56) References Cited

U.S. PATENT DOCUMENTS 5,867,483 A    2/1999  Ennis, Jr. et al.
7,801,104 B2   9/2010  Gaur
(Continued)

FOREIGN PATENT DOCUMENTS

WO    2019143189 A1    7/2019

*Primary Examiner* — Eric Myers
(74) *Attorney, Agent, or Firm* — Foley & Lardner LLP

(57) ABSTRACT

Disclosed herein are related to a system and a method of coordinating among artificial reality links. In one approach, a system comprising a first console for executing an application for artificial reality may include a wireless communication interface and a processor. The processor may be configured to send, via the wireless communication interface, a first message comprising a first plurality of parameters and a first schedule for access to a shared wireless channel by the first console, receive, from a second console via the wireless communication interface, a second message comprising a second plurality of parameters and a second schedule for access to the shared wireless channel by the second console, update, responsive to the second message, the first plurality of parameters and the first schedule, and/or send, via the wireless communication interface, a third message comprising the updated first plurality of parameters and the updated first schedule.

20 Claims, 9 Drawing Sheets

Related U.S. Application Data

(60) Provisional application No. 62/926,796, filed on Oct. 28, 2019.

(51) Int. Cl.

| | | |
|---|---|---|
| *H04L 41/5003* | (2022.01) | |
| *H04W 28/02* | (2009.01) | |
| *H04W 72/0446* | (2023.01) | |
| *H04W 72/51* | (2023.01) | |
| *H04W 72/54* | (2023.01) | |
| *H04W 24/08* | (2009.01) | |
| *H04W 48/06* | (2009.01) | |
| *G06T 1/20* | (2006.01) | |
| *H04W 56/00* | (2009.01) | |
| *H04W 72/12* | (2023.01) | |
| *G06T 19/00* | (2011.01) | |
| *G06F 3/14* | (2006.01) | |

(52) U.S. Cl.
CPC ....... *H04W 24/08* (2013.01); *H04W 28/0215* (2013.01); *H04W 48/06* (2013.01); *H04W 56/001* (2013.01); *H04W 72/0446* (2013.01); *H04W 72/12* (2013.01); *H04W 72/51* (2023.01); *H04W 72/54* (2023.01); *H04W 74/0816* (2013.01); *H04W 74/0825* (2013.01); *G06F 3/14* (2013.01); *G06T 19/006* (2013.01)

(58) Field of Classification Search
CPC ............. H04W 28/0215; H04W 48/06; H04W 56/001; H04W 72/0446; H04W 72/12; H04W 72/51; H04W 72/54; H04W 74/0816; H04W 74/0825; H04W 74/002; G06F 3/14

See application file for complete search history.

(56) References Cited

U.S. PATENT DOCUMENTS

| | | |
|---|---|---|
| 10,529,140 B1 | 1/2020 | Ravindran et al. |
| 10,885,719 B1 | 1/2021 | Ravindran et al. |
| 11,024,263 B2 | 6/2021 | Chhipa et al. |
| 11,043,031 B2 | 6/2021 | Barros et al. |
| 11,382,004 B2 | 7/2022 | Sharma et al. |
| 11,462,011 B2 | 10/2022 | Mason |
| 11,527,065 B2 | 12/2022 | Okamoto |
| 2014/0321423 A1 | 10/2014 | Kalhan |
| 2016/0345318 A1 | 11/2016 | Bhandaru et al. |
| 2017/0041929 A1 | 2/2017 | Noh et al. |
| 2018/0176730 A1 | 6/2018 | Szymczyk et al. |
| 2018/0270175 A1 | 9/2018 | Kim et al. |
| 2019/0043448 A1 | 2/2019 | Thakur et al. |
| 2019/0191376 A1 | 6/2019 | Kim et al. |
| 2019/0363843 A1 | 11/2019 | Gordaychik |
| 2020/0100197 A1 | 3/2020 | Pan et al. |
| 2020/0107060 A1 | 4/2020 | Khan et al. |
| 2020/0107068 A1 | 4/2020 | Khan et al. |
| 2020/0202629 A1 | 6/2020 | Sharma et al. |
| 2021/0076251 A1 | 3/2021 | Ho et al. |
| 2021/0120507 A1 | 4/2021 | De La Cruz et al. |
| 2022/0303603 A1 | 9/2022 | Demange et al. |

COORDINATION AMONG ARTIFICIAL REALITY LINKS

CROSS-REFERENCE TO RELATED APPLICATION

This application is a continuation of U.S. Non-Provisional patent application Ser. No. 16/935,983, filed on Jul. 22, 2020, which claims priority to U.S. Provisional Patent Application No. 62/926,796, filed Oct. 28, 2019, which is incorporated by reference in its entirety for all purposes.

FIELD OF DISCLOSURE

The present disclosure is generally related to communication for rendering artificial reality, including but not limited to coordinating among artificial reality links to meet both high throughput and low latency.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a method of coordinating among artificial reality links to meet both high throughput and low latency. In some embodiments, the method may include sending, by a first console executing an application for artificial reality, a first message comprising a first plurality of parameters and a first schedule for access to a shared wireless channel by the first console. The method may include receiving, by the first console from a second console, a second message comprising a second plurality of parameters and a second schedule for access to the shared wireless channel by the second console. The method may include updating, by the first console responsive to the second message, the first plurality of parameters and the first schedule. The method may include sending, by the first console, a third message comprising the updated first plurality of parameters and the updated first schedule.

In some implementations, the first schedule may indicate a plurality of time windows for accessing the shared wireless channel to transmit data of the artificial reality. In some implementations, the method may include receiving, by the first console from the second console, a fourth message comprising a plurality of parameters and a schedule for access to the shared wireless channel by the second console. The method may include further updating, by the first console responsive to the fourth message, the first plurality of parameters and the first schedule based on the second message and the fourth message. The method may include accessing, by the first console, the shared wireless channel using the further updated first plurality of parameters according to the further updated first schedule. In some implementations, the first message may further include a service level of the first console or the application for artificial reality.

In some implementations, the method may include measuring, by the first console, an interference during the first schedule. The method may include updating, by the first console according to the measured interference, the first plurality of parameters and the first schedule. The method may include sending, by the first console, the third message comprising the updated first plurality of parameters and the updated first schedule.

In some implementations, each of the first message, the second message, and the third message may be a management frame. The parameters for access to the shared wireless channel may include at least one of a transmission rate, a transmission frequency, enhanced distributed channel access (EDCA) parameters, a Quality of service (QoS), beam polarization, a transmission power level, transmission duration limit, or a space dimension for beamforming. At least one of the first message, the second message or the third message may be communicated between the first device and the second device via out-of-band signaling or via a database.

In some implementations, the method may include receiving, by the first console from the second console, a fourth message comprising a third schedule for access to the shared wireless channel by the second console, the third schedule being compatible with the updated first schedule. The method may include accessing, by the first console responsive to the fourth message, the shared wireless channel according to the updated first schedule. The method may include sending, by the first console, the third message comprising the updated first plurality of parameters and the updated first schedule, to at least one of the second console or a third console.

Various embodiments disclosed herein are related to a system of coordinating among artificial reality links. In some embodiments, the system includes a first console for executing an application for artificial reality may include a wireless communication interface and a processor. The processor may be configured to send, via the wireless communication interface, a first message comprising a first plurality of parameters and a first schedule for access to a shared wireless channel by the first console. The processor may be configured to receive, from a second console via the wireless communication interface, a second message comprising a second plurality of parameters and a second schedule for access to the shared wireless channel by the second console. The processor may be configured to update, responsive to the second message, the first plurality of parameters and the first schedule. The processor may be configured to send, via the wireless communication interface, a third message comprising the updated first plurality of parameters and the updated first schedule.

In some implementations, the first schedule may indicate a plurality of time windows for accessing the shared wireless channel to transmit data of the artificial reality. In some implementations, the processor may be configured to receive, from the second console via the wireless communication interface, a fourth message comprising a plurality of parameters and a schedule for access to the shared wireless channel by the second console. The processor may be configured to further update, responsive to the fourth message, the first plurality of parameters and the first schedule based on the second message and the fourth message. The processor may be configured to access, via the wireless communication interface, the shared wireless channel using the further updated first plurality of parameters according to the further updated first schedule.

In some implementations, the first message may further include a service level of the first console or the application for artificial reality. In some implementations, the processor may be further configured to measure an interference during the first schedule, update, according to the measured interference, the first plurality of parameters and the first schedule, and send, via the wireless communication interface, the third message comprising the updated first plurality of parameters and the updated first schedule.

In some implementations, each of the first message, the second message, and the third message may be a management frame. The parameters for access to the shared wireless channel may include at least one of a transmission rate, a transmission frequency, enhanced distributed channel access (EDCA) parameters, a Quality of service (QoS), beam polarization, a transmission power level, transmission duration limit, or a space dimension for beamforming. At least one of the first message, the second message or the third message may be communicated between the first device and the second device via out-of-band signaling or via a database.

In some implementations, the processor may be configured to receive, from the second console via the wireless communication interface, a fourth message comprising a third schedule for access to the shared wireless channel by the second console, the third schedule being compatible with the updated first schedule. The processor may be configured to, responsive to the fourth message, access, via the wireless communication interface, the shared wireless channel according to the updated first schedule.

In some implementations, the processor may be configured to send the third message comprising the updated first plurality of parameters and the updated first schedule, to at least one of the second console or a third console.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
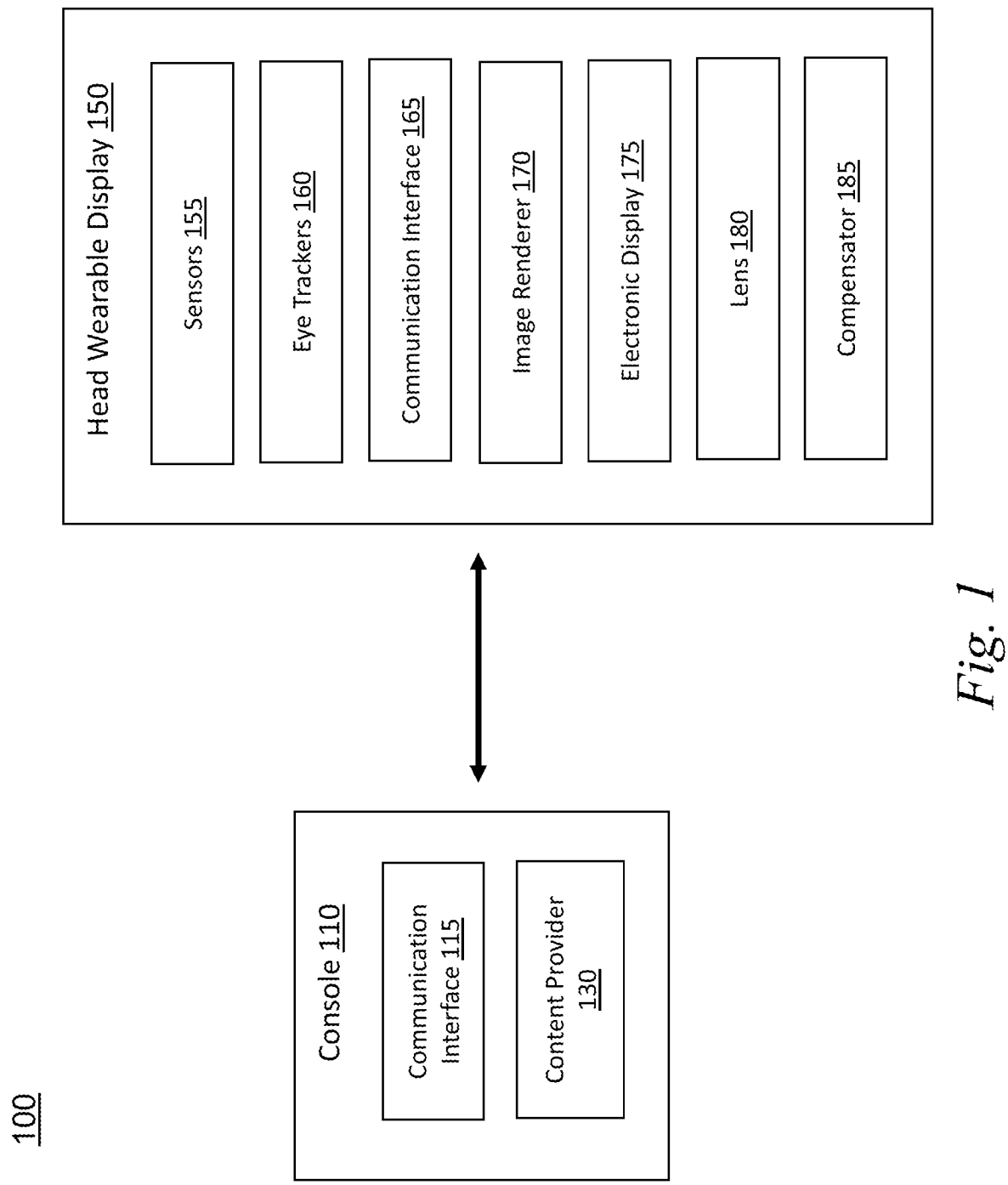
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates generally to systems and methods for communication for rendering artificial reality. More particularly, the present disclosure relates to systems and methods for coordinating among artificial reality links to meet both high throughput and low latency.

Multiple artificial reality (e.g, AR or VR) devices may use a shared medium to achieve both high throughput and low latency so that the users can have an immersive experience. For example, multiple devices for artificial reality applications may compete for the same channel to satisfy low latency requirements of key performance indicators (KPIs) or quality of service (QoS). However, each device may be subject to unbound latency because multiple devices would compete for the same wireless channel. This implies that the wireless channel as a shared medium cannot guarantee such KPIs or QoS, especially when unlicensed channels are used.

A pair of artificial reality devices (e.g., a console and a head wearable display (HWD)) can establish, support or maintain an artificial reality wireless link by communicating to each other via a shared wireless medium. Typically, better QoS may be achievable for an artificial reality wireless link by adjusting channel access parameters, giving the artificial reality wireless link an unfair advantage at least temporarily to get its data across in a time sensitive manner. This scheme, for example, by adapting or employing features of IEEE 802.11e, can be effective when artificial reality devices coexist with regular applications like internet browsing, ftp or buffered video/audio etc., as the former delays the latter as long as it gains latency advantage. This scheme, however, would not be effective if there are multiple artificial reality devices using the same strategy to minimize their respective latencies. In this case, it is useful to have schemes to coordinate among these artificial reality links so that they all can simultaneously meet their respective latency targets (e.g., KPI or QoS).

To solve this problem, according to certain aspects, coordinating among artificial reality wireless links for each artificial reality device may be performed to satisfy high throughput and low latency for users to have an immersive experience.

In one approach, multiple artificial reality wireless links can be coordinated based on management frames (e.g., beacons or beacon frames, control frames) transmitted by each artificial reality device. For example, an access point (AP) as an artificial reality device (e.g., a console communicatively coupled to a HWD) can transmit beacons that announce the presence of the AP and include different parameters, so that other APs (e.g., other consoles) receiving the beacons can detect the presence and parameters of the AP.

In one approach, each artificial reality device can detect beacons transmitted by other artificial reality devices by sniffing, sensing or monitoring a shared wireless channel. If each device detects presence of other artificial reality device on the same wireless channel, it can avoid the wireless channel and move to a different wireless channel. In some implementations, a protocol for arbitrating access to a wireless channel can be applied to determine priority between competing devices or between competing artificial reality wireless links so that a device or link with lower priority may move to a different channel. For example, the arbitrating protocol may be based on first-in first-out (FIFO), time of the day, a random counter value.

In one approach, each artificial reality device can specify its own latency preference or requirement (for example, those of KPI or QoS) in management frames (e.g., beacons) so that other artificial reality devices can detect the beacons and reduce their KPIs or QoS's based on other's latency preference or requirement as specified in the detected beacons.

In one approach, multiple APs (e.g., two APs) as artificial reality consoles may send management frames (e.g., beacons) specifying latency parameters, back and forth until the latency parameters of the two APs converge to parameters that satisfy both APs' latency requirements.

In one approach, traffic from different artificial reality devices may be isolated or separated from each other (on the same wireless channel) based on beacons transmitted by each artificial reality device. For example, traffic may be isolated in different times or schedules on the same wireless channel, or in different sub-channels of the same wireless channel having respective frequencies. In some implementations, traffic may be isolated in different space dimensions by polarization or beam forming. Each isolated traffic may be transmitted based on different channel parameters. For example, channel parameters may include start time or schedule of transmission, sub-channels or frequencies thereof, space dimensions by polarization, space dimensions by beam forming, duty cycle, transmission power level, or other channel access parameters (e.g., 802.11e parameters—EDCA (enhanced distributed channel access) parameters, TxOp (transmit opportunity), etc.). For example, different parameters can be specified in beacons for each traffic to be isolated in time and/or frequency domain(s) (e.g., using different times or different frequencies).

In one approach, an AP as an artificial reality console may measure an interference during a first schedule (e.g., a time window of the shared channel) of data transmission, update its channel parameters according to the measured interference, and send a message including the updated channel parameters and an updated first schedule. For example, if a first console detects that a second console's channel utilization provides little interference or conflict with the first console's communication requirements (e.g., delay requirement of KPI or QoS), the two devices can coexist in the same time or schedule (e.g., the same time window) on the same wireless channel. In some implementations, APs may initially attempt to avoid overlapping schedules by sharing and updating the schedule. If it is not possible to avoid overlapping schedules, then overlapping schedules may be allowed if interference is acceptable, minimized or not introduced between two devices (e.g., artificial reality consoles). For example, in response to determining that a value of the measured interference is less than a predetermined threshold, each AP may determine that interference is acceptable or absent between the AP and other APs and overlapping schedules between the APs is allowed.

In one approach, multiple artificial reality wireless links can be coordinated without using management frames (e.g., beacons) on the shared wireless medium. For example, in the context of a wireless broadband communication in unlicensed spectrum such as LTE-U (an unlicensed version of LTE) or NR-U (unlicensed spectrum in 5G), GPS or Bluetooth may be used to identify multiple artificial reality devices in close proximity. Instead of using beacons, the devices may use the Internet to perform and/or convey out of band signaling. For example, using such out of band signaling, an artificial reality device can detect not only the quality of the current channel but also the quality of other channels, and can move to a different channel if the quality of the different channel is better than that of the current channel.

In one approach, a method for coordinating among artificial reality links may include sending, by a first console executing an application for artificial reality, a first message comprising a first plurality of parameters and a first schedule for access to a shared wireless channel by the first console. The method may include receiving, by the first console from a second console, a second message comprising a second plurality of parameters and a second schedule for access to the shared wireless channel by the second console. The method may include updating, by the first console responsive to the second message, the first plurality of parameters and the first schedule. The method may include sending, by the first console, a third message comprising the updated first plurality of parameters and the updated first schedule.

In one approach, a system of coordinating among artificial reality links, can include a first console for executing an application for artificial reality, which may include a wireless communication interface and a processor. The processor may be configured to send, via the wireless communication interface, a first message comprising a first plurality of parameters and a first schedule for access to a shared wireless channel by the first console. The processor may be configured to receive, from a second console via the wireless communication interface, a second message comprising a second plurality of parameters and a second schedule for access to the shared wireless channel by the second console. The processor may be configured to update, responsive to the second message, the first plurality of parameters and the first schedule. The processor may be configured to send, via the wireless communication interface, a third message comprising the updated first plurality of parameters and the updated first schedule.

Implementations in the present disclosure have at least the following advantages and benefits.

First, implementations in the present disclosure can provide coordination (e.g., management of fairness between devices in utilizing a channel) among multiple artificial reality devices by transmitting management frames (e.g., beacons) by each device. Based on schedules or parameters specified in the beacons transmitted by other devices, each device can (1) avoid the current channel, (2) backoff, adjust, or reduce its traffic, or (3) isolate or separate its traffic from other devices' traffic, so as to meet the requirements for low latency or high throughput.

Second, implementations in the present disclosure can provide coordination among multiple artificial reality devices by communicating management frames back and forth (e.g., over one or more iterations) until the schedules or parameters of each device can converge to schedules or parameters that meet its target latency or target throughput. With this configuration, the devices can negotiate with other devices to achieve optimal values of latency and throughput that are approximately its fair share values among multiple devices using the same channel.

Third, implementations in the present disclosure can provide coordination among multiple artificial reality devices by accessing other device's schedules or channel parameters using out of band signaling in a wireless broadband communication, for example. With this configuration, the devices can achieve low latency and high throughput without communicating management frames (e.g., beacons) on the shared wireless channel. Moreover, using such out of band signaling, a device can detect not only the quality of the current channel but also the quality of other channels.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HDM 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms). In one aspect, the communication interface 115 can adaptively transmit the additional data to the HWD 150 as described below with respect to FIGS. 3 through 6.

Figure 2:
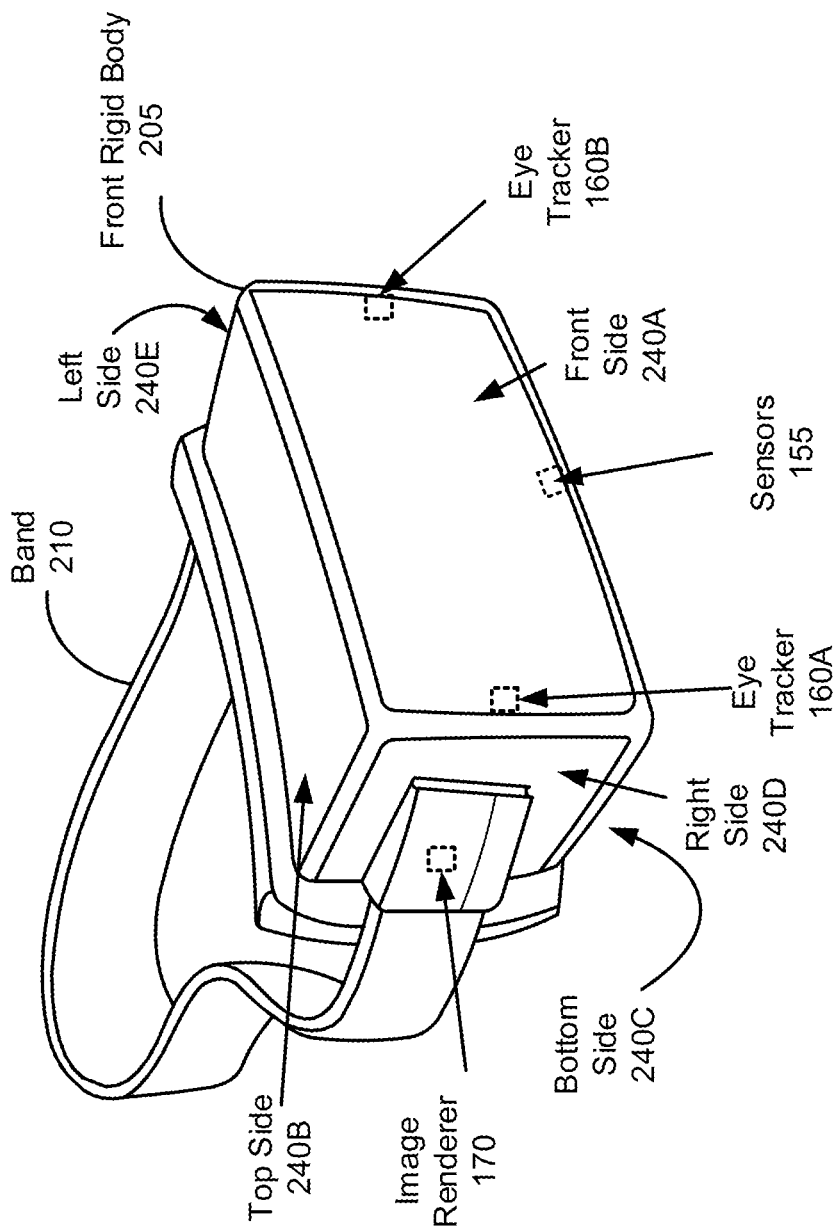
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
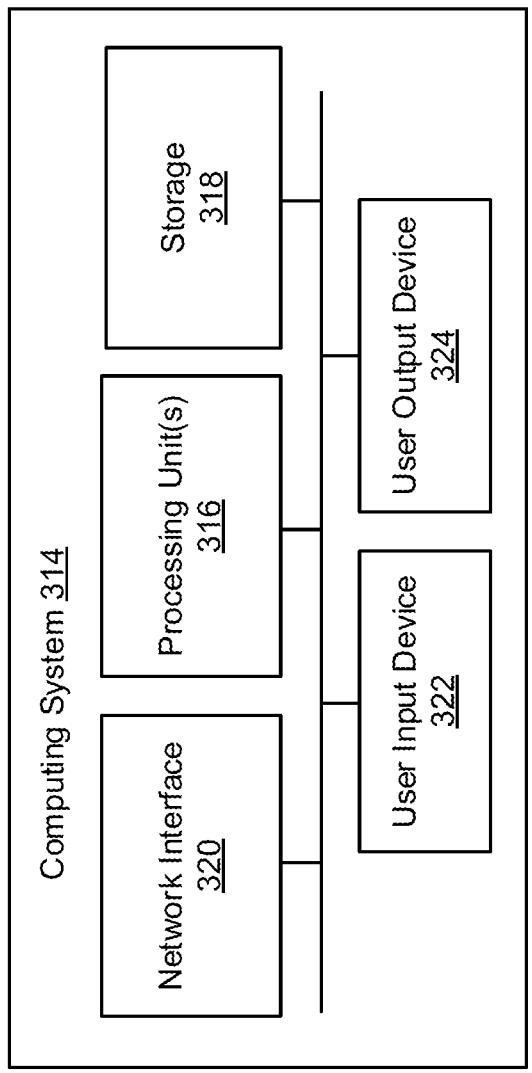
FIG. 3 is a block diagram of a computing environment according to an example implementation of the present disclosure.

FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Various operations described herein can be implemented on computer systems having the configuration that is same as or similar to that of the computing system 314.

Figure 4:
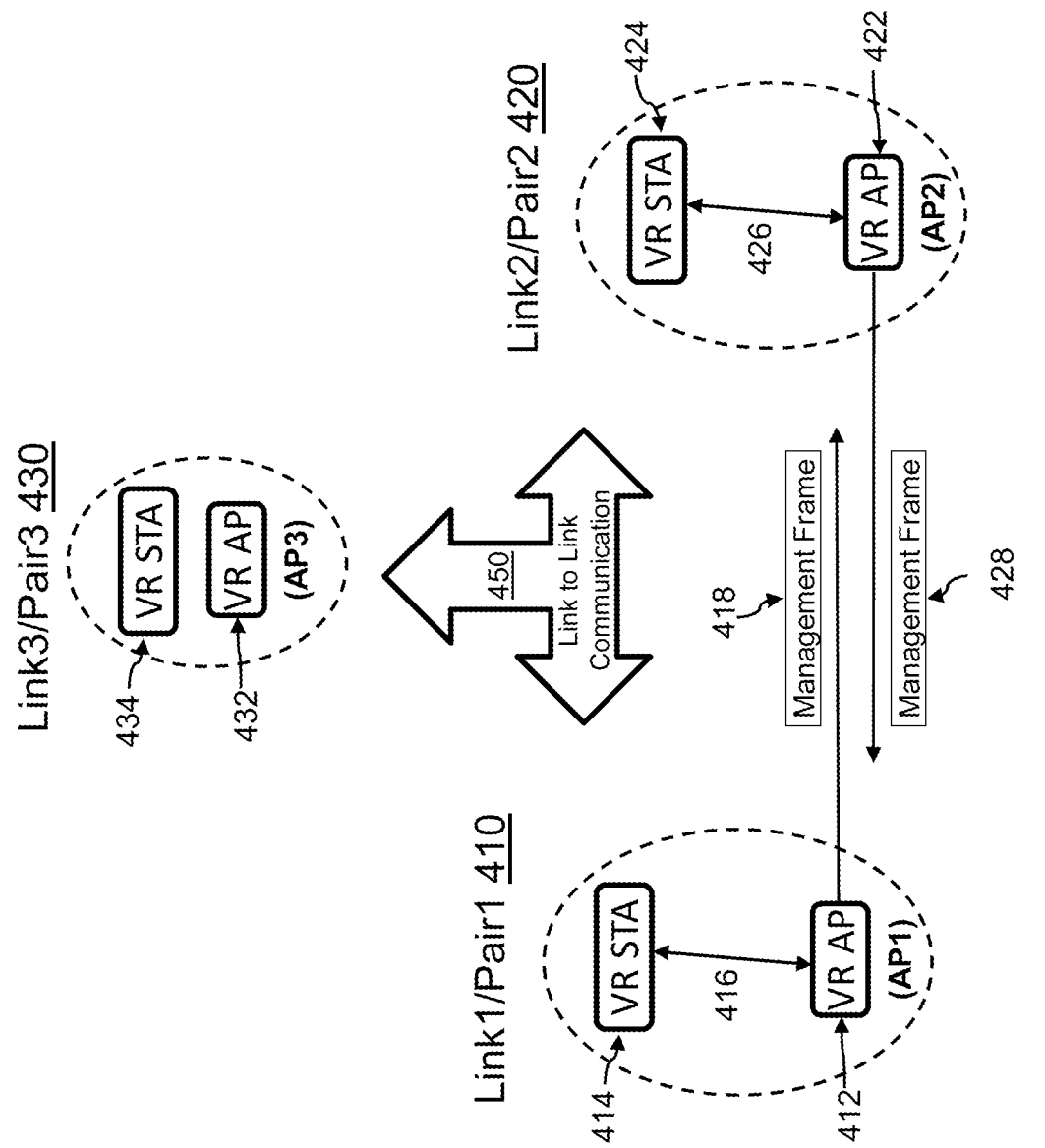
FIG. 4 is a diagram of a system environment including artificial reality links, according to an example implementation of the present disclosure.

FIG. 4 is a diagram of a system environment including artificial reality links, according to an example implementation of the present disclosure. Referring to FIG. 4, an artificial reality wireless link 1 (denoted by 410) includes a pair of an AP1 (access point) 412 and a station 414 communicating 416 with AP1 via a shared wireless medium 450 (e.g., the same wireless channel in a wireless network). Here, the wireless network may be, but not limited to, wireless local area network (LAN), wireless personal area network (PAN), wireless ad hoc network, or wireless metropolitan area network (MAN). An artificial reality wireless link 2 (denoted by 420) includes a pair of an AP2 (access point) 422 and a station 424 communicating 426 with AP2 via the shared wireless medium 450. Similarly, an artificial reality wireless link 3 (denoted by 430) includes a pair of an AP3 (access point) 432 and a station 434. In some implementations, each of AP1, AP2, AP3 may be an artificial reality console, and the stations 414, 424, 434 may be HWDs respectively communicating with AP1, AP2, AP3. In some implementations, artificial reality links 410, 420, 430 may communicate with each other on the same or shared wireless medium 450 (e.g., the same wireless channel in a wireless LAN).

In some implementations, AP1 may communicate a management frame 418 via the shared wireless medium 450 so that AP2 can detect or receive the management frame 418. For example, AP1 may broadcast a beacon frame via a wireless channel in an 802.11 WiFi network. Similarly, AP2 may communicate a management frame 428 (e.g., broadcast a beacon frame) via the shared wireless medium 450 (e.g., a wireless channel in an 802.11 WiFi network) so that AP1 can detect the management frame 428. In some implementations, instead of broadcasting management frames, AP1 and AP2 may communicate management frames to each other using unicast (to a particular destination device) or multicast (to a set of destination devices).

Figure 5:
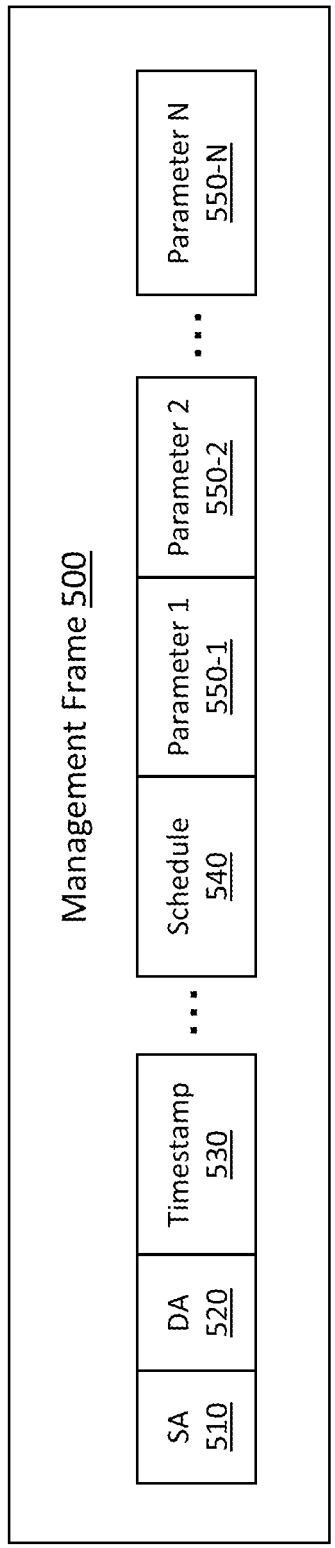
FIG. 5 is a diagram of a management frame according to an example implementation of the present disclosure.

FIG. 5 depicts a representation of a management frame according to an example implementation of the present disclosure. FIG. 5 shows an example data structure of a management frame 500 which corresponds to the management frames 418, 428 in FIG. 4.

In some implementations, the management frame 500 may be, but not limited to, a beacon frame, an association request, an association response, a probe request, a probe response, ATIM (announcement traffic indication message), a disassociation message, an authentication message, or a deauthentication message. The management frame 500 may include a plurality of fields for broadcast, unicast, or multicast traffic, for example, SA (source address) 510, DA (destination address) 520, timestamp 530, etc. The management frame 500 may include fields related to management of wireless network, e.g., management frame type, beacon interval (for beacon frames), etc.

Referring to FIG. 5, the management frame 500 may include one or more "schedule" fields 540, and a plurality of "parameters" fields including parameter 1 (550-1), parameter 2 (550-2), . . . parameter N (550-N). In some implementations, the schedule field 540 and the parameters fields may be added as new fields to conventional management frame format (e.g., 802.11 management frame format). In some implementations, the schedule field 540 and the parameters fields may be indicated by redefining or adapting fields of a conventional management frame format. In some implementations, the schedule field 540 may indicate when the device sending the management frame 500 would access the wireless medium. For example, the schedule field 540 may include at least one of a start time (or start times) of artificial reality traffic, repeating interval of traffic, duration of traffic, or slot window (if slots are defined similar to time slots in time-division multiple access (TDMA)). In some implementations, the start time may be defined as a time relative to the transmission time of the management frame 500 (e.g., time indicated by the timestamp field 530). In some implementations, slot window may be defined as a pair of start time and duration (or end time) of a TDMA slot.

In some implementations, in a slot assigned to a particular device or a particular user, the particular device or user can have a highest priority EDCA parameter among all devices or users on the same channel while other devices or users will have lower priority EDCA parameters on this slot. For example, in a slot assigned to a first device (among three devices on the same channel), the first device can use the smallest value of arbitration inter-frame spacing (AIFS) and contention window (CW) among the devices so that during the slot window, the first device can win contention for the channel. In this manner, a device not only can access its own slot but also can access other slots with a lower priority or with infrequent access when other slots are not used by the devices which own those slots.

In some implementations, the parameters fields may indicate how the device sending the management frame 500 would access the wireless medium. In some implementations, the parameters fields may include fields specifying delay or latency preference of the device sending the management frame 500, for example, target values of KPI or QoS. In some implementations, the parameters fields may include fields specifying a frequency band (or frequency bands) the device would use in accessing the wireless medium, for example, sub-channel frequencies in frequency-division multiplexing (FDM), orthogonal frequency-division multiple access (OFDMA). In some implementations, the parameters fields may include fields specifying space dimensions of polarization or beamforming when the device would use polarization or beamforming in sending traffic. In some implementations, the parameters fields may include fields specifying duty cycle, airtime allocation (e.g., Transmit Opportunity (TXOP) in 802.11e), channel access parameters, or transmission power levels, etc., which the device sending the management frame would use in accessing the shared medium or channel. For example, channel access parameters may include supported rates, EDCA parameter set in 802.11e, QoS capability, service level, etc. For example, service level may indicate levels of priority or access categories (AC) or class of services (CoS), similar to those defined in 802.11e (one of Background, Spare, Best effort, Excellent Effort, Video, Voice, or Network Control, etc.).

Now, various systems or methods of coordinating among artificial reality devices according to some implementations of the present disclosure will be described with reference to FIG. 4 and FIG. 5.

In some implementations, each AP (e.g., AP1, AP2, AP3 in FIG. 4) may transmit, via a shared wireless medium (e.g., the wireless medium 450 in FIG. 4), management frames (e.g., beacons broadcast by each AP) including fields that announce its presence (e.g., the SA field 510 in FIG. 5), and fields specifying different parameters relevant to access to the shared wireless medium (e.g., parameter fields 550-1 to 550-N in FIG. 5) so that each AP can look or detect other's beacons. Each AP (e.g., corresponding to each wireless artificial reality link) may then perform coordination based on such beacons. For example, when a first wireless artificial reality link (e.g., AP1 in FIG. 4) broadcasts a management frame (e.g., the management frame 418 in FIG. 4), a second link (e.g., AP2 in FIG. 4) that detect or receive this broadcast frame can adapt its own transmission. In some implementations, the second link can broadcast its own management frame (e.g., the management frame 428 in FIG. 4) specifying its desired delay parameters (based on the management frame broadcast from the first link) to coordinate the transmissions with the first link.

In some implementations, artificial reality devices may monitor or sniff the wireless channel they use, and if they find other device or devices on the channel based on the information of monitored traffic, then they may move to another channel. In this manner, each device can totally avoid the channel (e.g., for a certain time period), thereby avoiding overlapping time or schedule with other devices on the same channel. In some implementations, on startup, before beginning transmission of artificial reality data, an artificial reality device may monitor or sniff a first channel for some amount of time to find the presence of an active wireless link, e.g., a link for transmitting artificial reality data by other devices. If the device finds an active link for artificial reality traffic based on information of monitored traffic (e.g., traffic type fields, QoS fields, or service level fields of data frames, or parameter fields of management frames as shown in FIG. 5), it may then move to a different frequency and repeat the process (monitoring and moving to other channels). In some implementations, each device may determine priority between the device and competing devices so that a lower priority device may move to other channel. In some implementations, devices may use a protocol to arbitrate access to the channel (e.g., first-in first-out (FIFO)) in determining the priority so that high priority access is conferred to and retained by the device or user that arrives first. In some implementations, time of the day and/or random counter value can be used to decide the priority of the device or user in using a particular channel. For example, a priority can be assigned to a device or user using a result of calculating a predefined equation/formula with the identifier of the device and the time of the day (or a random number) as input parameters to the equation/formula.

In some implementations, an artificial reality device (e.g., AP1) may broadcast a beacon frame (e.g., the management frame 418 in FIG. 4) indicating its own delay preference (e.g., QoS or KPI) in the beacon frame so other devices detecting the beacon frame can reduce QoS or KPI based on other's delay preference. In this manner, each device does not need to totally avoid the channel (e.g., by moving to another channel or withholding transmission) but instead can indicate its own presence to other devices so the other devices can adapt their channel access parameters. For example, a first artificial reality device (e.g., AP1 in FIG. 4) can indicate the KPIs the first artificial reality device is supposed to meet (by broadcasting management frames, for example) so that a second artificial reality device or link (e.g., AP2 or Link2 in FIG. 4) can backoff some of its traffic so that both devices can simultaneously meet their KPIs.

In some implementations, artificial reality devices can isolate or separate traffic from each other using management frames. For example, a first device may broadcast management frames specifying (1) desired time or schedule or desired values of duty cycle, airtime allocation, channel access parameters, (2) a desired frequency band (or frequency bands), (3) desired space dimensions of polarization or beamforming, or (4) desired transmission power levels, so that other devices can isolate or separate their traffic from the first device in terms of (1) medium access time, (2) sub-channel frequency in FDM or OFDMA, for example, (3) physical space dimensions of wireless signals, or (4) transmission power levels. In this manner, a device can be coordinated to improve its KPI or QoS by specifying what channel access parameters are used for each time it access the medium or for each resource it uses in such access (e.g., a frequency resource).

In some implementations, an AP as an artificial reality console (e.g., AP1 in FIG. 4) may measure an interference during a first schedule (e.g., a time window of the shared channel specified in the schedule field 540 in FIG. 5) of data transmission, update its channel parameters (e.g., channel parameters specified in the parameters fields 550 in FIG. 5) according to the measured interference, and send a message (e.g., the management frame 418 in FIG. 4) including the updated channel parameters and an updated first schedule. In some implementations, the interference can be measured not only based on conflicting traffic schedules between devices but also based on quality of wireless signals that can be obtained from values of signal-to-ratio (SNR) and/or received signal strength indication (RSSI). For example, if a first console detects that a second console's channel utilization provides little interference or conflict with the first console's communication requirements (e.g., delay requirement of KPI or QoS), the two devices can coexist in the same time or schedule (e.g., the same time widow) on the same wireless channel. In some implementations, APs may initially attempt to avoid overlapping schedules by sharing and updating the schedule. If it is not possible to avoid overlapping schedules, then overlapping schedules may be allowed if interference is acceptable or not introduced between two devices (e.g., artificial reality consoles). For example, in response to determining that a value of the measured interference (based on quality of wireless signals) is less than a predetermined threshold, each AP may determine that interference is not introduced between the AP and other APs and overlapping schedules between the APs is allowed.

Figure 6:
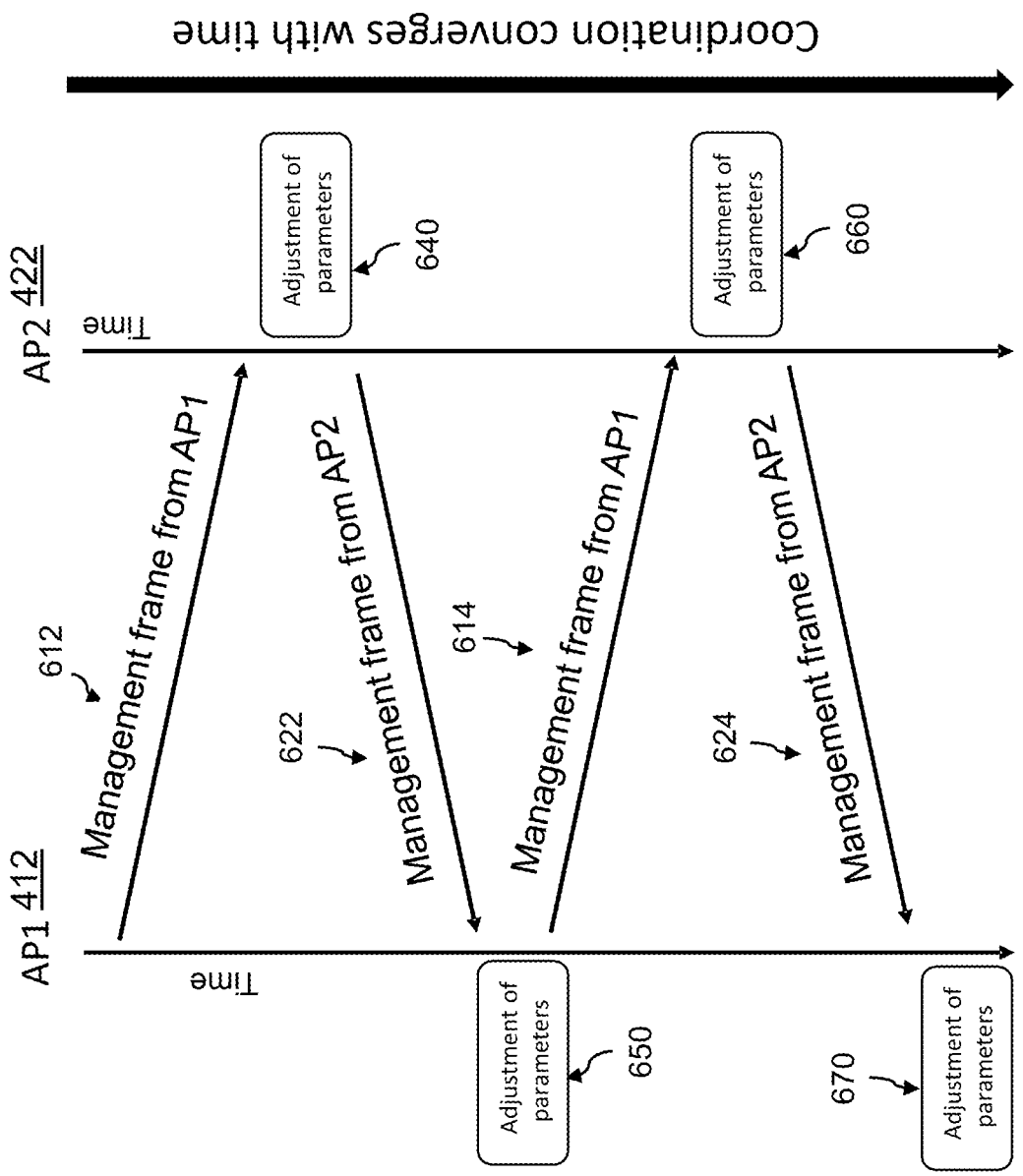
FIG. 6 is an example timing diagram of communication between artificial reality links in the system environment shown in FIG. 4, according to an example implementation of the present disclosure.

FIG. 6 is an example timing diagram of communication between artificial reality links in the system environment shown in FIG. 4, according to an example implementation of the present disclosure. FIG. 6 shows that two APs 412, 422 (as artificial reality consoles) continuously perform adjustments of parameters 640, 650, 660, 670 by exchanging management frames 612, 622, 614, 624.

Referring to FIG. 6, in some implementations, management frames 612, 622, 614, 624 may have a frame format that is the same as or similar to that shown in FIG. 5. In some implementations, two (or more) APs 412, 422 may exchange, broadcast or send beacon frames back and forth, or in some other order among the APs (e.g., over several iterations) to continuously adjust their respective schedules and/or access parameters (e.g., channel access parameters) based on the other's beacon. For example, AP2 may perform adjustment 640 of its schedules and access parameters based on the management frame 612 sent or broadcast from AP1, and send or broadcast the management frame 622 specifying the adjusted schedules and parameters. Subsequently, AP1 may perform adjustment 650 of its schedules and access parameters based on the management frame 622 from AP2 and send or broadcast the management frame 614 specifying the adjusted schedules and parameters, and so on.

In some implementations, since one device cannot unilaterally dictate its parameters for the other, two APs may send beacon frames back and forth until the parameters specified in the beacon frames (e.g., those specified in the parameters fields 550 in FIG. 5) converge to parameters each AP would consider to be optimal. In some implementations, each AP may sniff or monitor the shared wireless medium (e.g., wireless channel) and calculate its fair share of time and/or frequency resources among all wireless devices using the shared wireless medium (e.g., 1/N fair share of airtime among N wireless devices). In some implementations, two APs for instance may send beacon frames back and forth until the parameters specified in the beacon frames converge to parameters that can approximately achieve the fair share of time and frequency resources of each AP.

In some implementations, one device (e.g., AP1) can receive messages (e.g., management frames) from multiple devices (e.g., AP2 and AP3 in FIG. 4), and may respond based on a union (or aggregation) of all messages. For example, AP1 may adjust its medium access parameters based (1) an aggregated schedule of a schedule specified in the management frame received from AP2 and a schedule specified in the management frame received from AP3, and/or (2) aggregated parameters of parameters specified in the management frame received from AP2 and parameters specified in the management frame received from AP3. In some implementations, there can be multiple rounds of adjusting access schedules/parameters that are transmitted (e.g., at least 3 rounds) before a device can access the channel. Referring to FIG. 6, after performing the adjustment 670 of its schedule/parameters, AP1 may access the channel using the schedule/parameters as adjusted in the adjustment 670.

In some implementation, if a first device (AP1 in FIG. 6) detects interference with a second device (AP2 in FIG. 6), the first device may report interference to the second device as part of the sharing parameter mechanism and negotiation (as shown in FIG. 6), so that the interfering device AP2 can be aware of the interference it is creating.

In some implementations, when one device changes or adjusts allocation or schedule of resources (e.g., time, frequency, etc.) and transmits a message indicating the changes or adjustment, another device (or other devices) may respond dynamically by moving its schedule to accommodate the transmission of the message. Instead of sharing schedules for data transmission directly, a first device may first share the intent to transmit using a desired schedule element (e.g., a particular time slot) by indicating the intent in a message (e.g., in the parameters fields of a management frame) and broadcasting the message. In response, a second device may clear the requested slot and convey the new schedule of the second device to the first device, and then the first device can send the actual schedule (e.g., by including it in a management frame) and use the channel.

Figure 7:
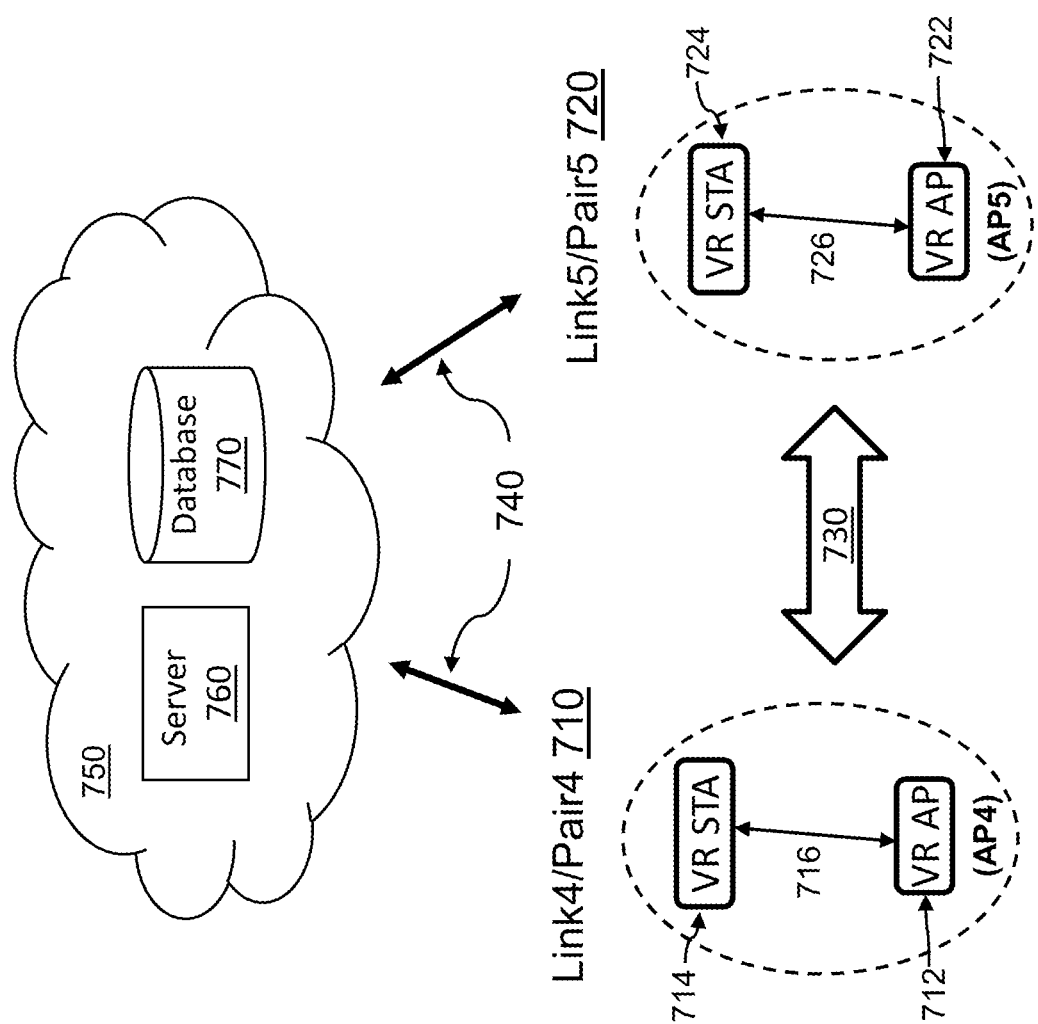
FIG. 7 is a diagram of a system environment including artificial reality links, according to an example implementation of the present disclosure.

FIG. 7 is a diagram of a system environment including artificial reality links, according to an example implementation of the present disclosure. Referring to FIG. 7, an artificial reality wireless link 4 (denoted by 710) includes a pair of an AP4 (access point) 712 and a station 714 communicating 716 with AP4 via a shared wireless medium 730 (e.g., the same wireless channel in a wireless network). Here, the wireless network may be, but not limited to, wireless local area network (LAN), wireless personal area network (PAN), wireless ad hoc network, or wireless metropolitan area network (MAN). An artificial reality wireless link 5 (denoted by 720) includes a pair of an AP5 (access point) 722 and a station 724 communicating 726 with AP5 via the shared wireless medium 730. In some implementations, each of AP4 and AP5 may be an artificial reality console, and the stations 714, 724 may be HWDs respectively communicating with AP4 and AP5. In some implementations, artificial reality links 710, 720 may communicate with each other on the same or shared wireless medium 730 (e.g., the same wireless channel in a wireless LAN).

In some implementations, AP4 and AP5 can communicate with a server 760 and a database 770 in a cloud system 750 using out of band signaling 740 (using a band different from the wireless channel 730, for example, a different channel, a different radio interface, the Internet, among others). In some implementations, the server 760 may have configurations similar to that of the computing system 314 in FIG. 3. In some implementations, the server 760 may be configured to manage and update the database 770 which stores data relating to schedules and medium access parameters of artificial reality devices sharing the wireless medium 730. In some implementations, when its schedules or parameters on the wireless medium 730 change, each of AP4 and AP5 may send a message to the server 760 so that the server 760 updates the database 770 according to the changes. In some implementations, when the server 760 updates the database 770 with information relating to schedules or parameters of devices sharing the wireless medium 730, the server 760 may send a message including the update to all the devices sharing the wireless medium 730. In some implementations, the server 760 may receive GPS or Bluetooth information from the devices and identify multiple devices in close proximity, and send a message including the update only to the devices in close proximity to the device(s) whose schedules or parameters have changed.

Figure 8:
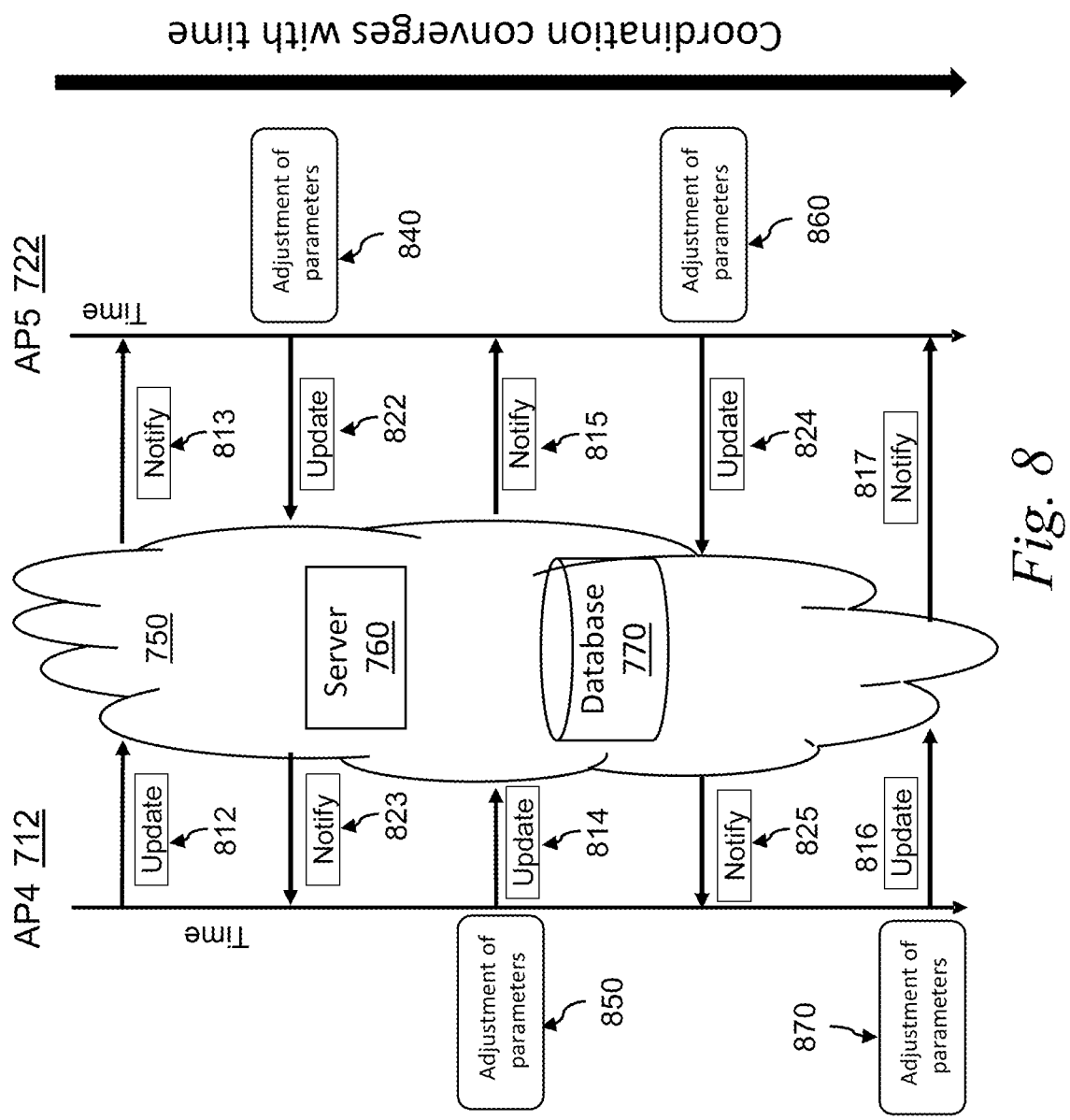
FIG. 8 is an example timing diagram of communication between artificial reality links in the system environment shown in FIG. 7, according to an example implementation of the present disclosure.

FIG. 8 is an example timing diagram of communication between artificial reality links in the system environment shown in FIG. 7, according to an example implementation of the present disclosure. FIG. 8 shows that two APs 712, 722 (as artificial reality consoles) can continuously perform adjustments of parameters 840, 850, 860, 870 by sending update messages 812, 822, 814, 824 to the server 760 and receiving notify messages 813, 823, 815, 825.

Referring to FIG. 8, in some implementations, two APs (AP4 and AP5) may exchange their schedules and parameters back and forth (e.g., over several iterations) through the database 770 to continuously adjust their respective schedules and access parameters (e.g., channel access parameters) based on the other's updated schedules and parameters. For example, AP4 may update its schedules and parameters and send the update message 812 indicating the update to the server 760. Responsive to the update message 812, the server 760 may update the database 770 accordingly and send the notify message 813 indicating the update of AP4 to AP5. In response, AP5 may perform adjustment 840 of its schedules and access parameters based on the notify message 813, and can send the update message 822 specifying the adjusted schedules and parameters to the server 760. Responsive to the update message 822, the server 760 may update the database 770 accordingly and may send the notify message 823 indicating the update of AP5 to AP4. In response, AP4 may perform adjustment 850 of its schedules and access parameters based on the notify message 823, and may send the update message 814 specifying the adjusted schedules and parameters to the server 760, and so on. In this manner, without exchanging management frames on the shared wireless medium, artificial reality devices can adjust their respective schedules and parameters that approximately converge to their respective fair share of time and frequency resources among all the artificial reality devices on the shared wireless medium.

For example, in the context of a wireless broadband communication in unlicensed spectrum such as LTE-U (an unlicensed version of LTE) or NR-U (unlicensed spectrum in 5G), if a pair of WiFi device (e.g., AP4 and station 714 in FIG. 7) are trying to communicate in the presence of a pair of LTE-U or NR-U devices (e.g., AP5 and station 724 in FIG. 7) on the same channel (e.g., the medium 730), then in this case there is no physical layer protocol that allows these two pairs (e.g., the link 4 and the link 5 in FIG. 7) to communicate with each other. In this case, a common cloud infrastructure (e.g., the cloud system 750) can be used to notify each other about their proximity (based on GPS information or Bluetooth proximity, received from each pair) and can then coordinate with each other to meet each of their target KPIs or QoS's. In this manner, using such out of band signaling (e.g., the signaling 740 in FIG. 7), multiple artificial reality wireless links can be coordinated without using management frames (e.g., beacons) on the shared wireless medium.

In some implementations, using such out of band signaling, an artificial reality device can detect not only the quality of the current channel but also the quality of other channels, and can move to a different channel if the quality of the different channel is better than that of the current channel. In some implementations, out of band signaling (e.g., the Internet, or another radio interface) can also be used to notify the status of channels that are not actively observed by a device (e.g., a channel that is not currently used by the device). For example, when artificial reality traffic is ongoing, without such out of band signaling, it might not be feasible for a device to move temporarily to a different channel to observe and judge the quality of that channel. Using such out of band signaling, the device can query a remote server (e.g., the server 760 in the cloud system 750) to understand the utilization in other channels in proximity to that device, so that the device can keep track of the utilization stats on other channels.

In some implementations, a system as a first console (e.g., AP1 in FIG. 4 and FIG. 6) for executing an application for artificial reality may include a wireless communication interface (e.g., the network interface 320) and a processor (e.g., the processing unit 316). The processor may be configured to send, via the wireless communication interface, a first message (e.g., the management frame 612 in FIG. 6) including a first plurality of parameters (e.g., the parameters 550 in FIG. 5) and a first schedule (e.g., the schedule 540 in FIG. 5) for access to a shared wireless channel (e.g., the wireless medium or channel 450 in FIG. 4) by the first console. The processor may be configured to receive, from a second console (e.g., AP2 in FIG. 4 and FIG. 6) via the wireless communication interface, a second message (e.g., the management from 622 in FIG. 6) including a second plurality of parameters and a second schedule for access to the shared wireless channel by the second console. The processor may be configured to update, responsive to the second message, the first plurality of parameters and the first schedule (e.g., the adjustment of parameters 650 in FIG. 6). The processor may be configured to send, via the wireless communication interface, a third message (e.g., the management frame 614 in FIG. 6) including the updated first plurality of parameters and the updated first schedule.

In some implementations, the processor may be configured to receive, from the second console via the wireless communication interface, a fourth message (e.g., the management frame 624 in FIG. 6) including a plurality of parameters and a schedule for access to the shared wireless channel by the second console. The processor may be configured to further update, responsive to the fourth message, the first plurality of parameters and the first schedule based on the second message and the fourth message (e.g., the adjustment of parameters 670 in FIG. 6). The processor may be configured to access, via the wireless communication interface, the shared wireless channel using the further updated first plurality of parameters according to the further updated first schedule (e.g., after performing the adjustment of parameters 670, AP1 may access the shared wireless channel).

In some implementations, the processor may be configured to receive, from the second console via the wireless communication interface, a fourth message (e.g., the management frame 624 in FIG. 6) including a third schedule for access to the shared wireless channel by the second console, the third schedule being compatible with the updated first schedule. The processor may be configured to, responsive to the fourth message, access, via the wireless communication interface, the shared wireless channel according to the updated first schedule (e.g., if the management frame 624 confirms that the updated schedule of AP2 is compatible with the last updated schedule of AP1 indicated by the management frame 614, AP1 may access the shared wireless channel without performing the adjustment of parameters 670).

In some implementations, the processor may be configured to send the third message (e.g., the management frame 614 in FIG. 6) including the updated first plurality of parameters and the updated first schedule, to at least one of the second console (e.g., AP2 in FIG. 4 and FIG. 6) or a third console (e.g., AP3 in FIG. 4 and FIG. 6).

In some implementations, the processor may be further configured to measure an interference (e.g., traffic schedule conflict or quality of wireless signal) during the first schedule (e.g., a time window of the shared channel specified in the schedule field 540 in FIG. 5), update, according to the measured interference, the first plurality of parameters (e.g., channel parameters specified in the parameters fields 550 in FIG. 5) and the first schedule, and send, via the wireless communication interface, the third message including the updated first plurality of parameters and the updated first schedule.

In some implementations, each of the first message (e.g., the management frame 612 in FIG. 6), the second message (e.g., the management frame 622 in FIG. 6), and the third message (e.g., the management frame 614 in FIG. 6) may be a management frame. In some implementations, the first schedule may indicate a plurality of time windows for accessing the shared wireless channel to transmit data of the artificial reality. The parameters for access to the shared wireless channel may include at least one of a transmission rate, a transmission frequency, enhanced distributed channel access (EDCA) parameters, a Quality of service (QoS), beam polarization, a transmission power level, transmission duration limit, or a space dimension for beamforming. In some implementations, the first message may further include a service level of the first console or the application for artificial reality.

In some implementations, at least one of the first message (e.g., the update message 812 in FIG. 8), the second message (e.g., the update message 822 in FIG. 8) or the third message (e.g., the update message 814 in FIG. 8) may be communicated between the first device (e.g., AP4 in FIG. 8) and the second device (e.g., AP5 in FIG. 8) via out-of-band signaling (e.g., the out-of-band signaling 740 in FIG. 7) or via a database (e.g., the database 770 in FIG. 7 and FIG. 8).

Figure 9:
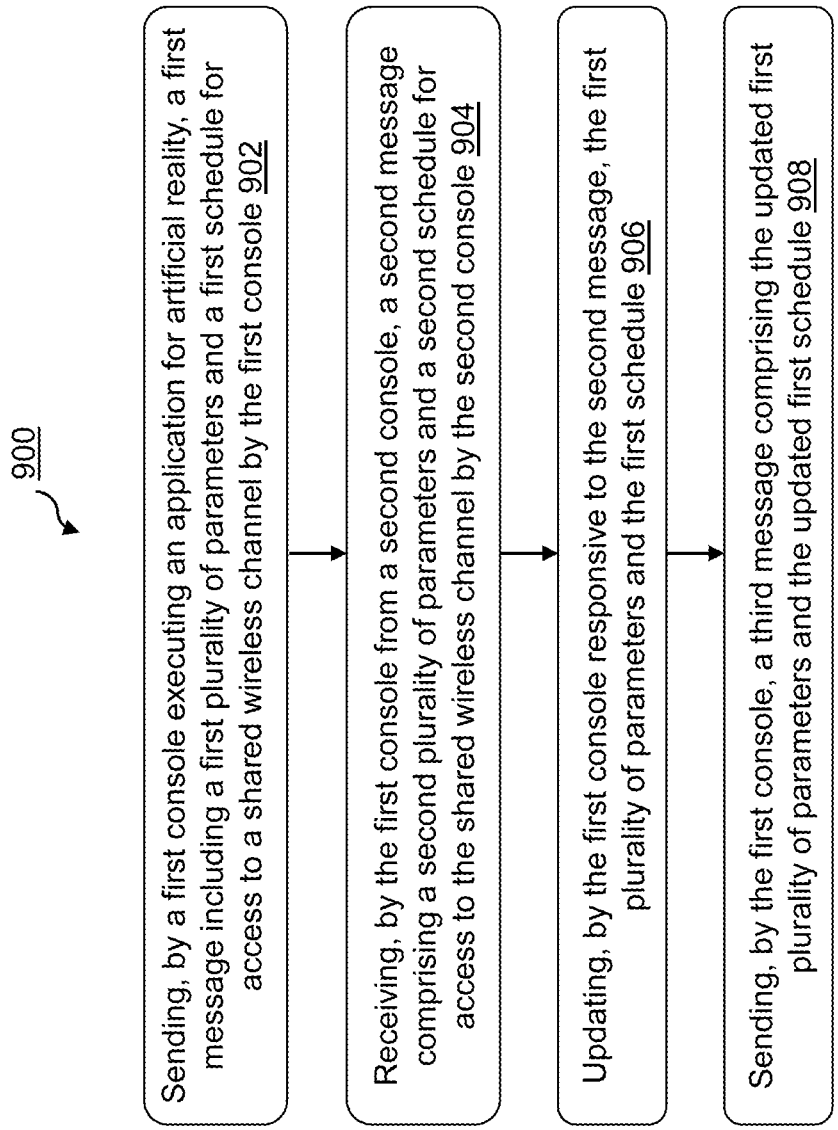
FIG. 9 shows a flow diagram of an example process of coordination among artificial reality links, according to an example implementation of the present disclosure.

FIG. 9 shows a flow diagram of an example process 900 of coordination among artificial reality links, according to an example implementation of the present disclosure. In some embodiments, the process 900 includes more, fewer, or different steps than shown in FIG. 9.

In a process 902, a first console (e.g., AP1 in FIG. 4 and FIG. 6) executing an application for artificial reality, may send a first message (e.g., the management frame 612 in FIG. 6) including a first plurality of parameters (e.g., the parameters 550 in FIG. 5) and/or a first schedule (e.g., the schedule 540 in FIG. 5) for access to a shared wireless channel (e.g., the wireless medium or channel 450 in FIG. 4). In some implementations, the first schedule may indicate a plurality of time windows for accessing the shared wireless channel to transmit data of the artificial reality. In some implementations, the parameters for access to the shared wireless channel may include at least one of a transmission rate, a transmission frequency, enhanced distributed channel access (EDCA) parameters, a Quality of service (QoS), beam polarization, a transmission power level, transmission duration limit, or a space dimension for beamforming. In some implementations, the first message may further includes a service level of the first console or the application for artificial reality.

In a process 904, the first console may receive a second message (e.g., the management from 622 in FIG. 6) including a second plurality of parameters and/or a second schedule for access to the shared wireless channel by a second console (e.g., AP2 in FIG. 4 and FIG. 6), from the second console.

In a process 906, the first console may adjust, modify or otherwise update the first plurality of parameters and the first schedule responsive to the second message (e.g., the adjustment of parameters 650 in FIG. 6).

In a process 908, the first console may generate and/or send a third message (e.g., the management frame 614 in FIG. 6) including the updated first plurality of parameters and the updated first schedule. In some implementations, each of the first message (e.g., the management frame 612 in FIG. 6), the second message (e.g., the management frame 622 in FIG. 6), and the third message (e.g., the management frame 614 in FIG. 6) may be a management frame.

In some implementations, the first console (e.g., AP1 in FIG. 4 and FIG. 6) may receive a fourth message (e.g., the management frame 624 in FIG. 6) including a plurality of parameters and a schedule for access to the shared wireless channel by the second console (e.g., AP2 in FIG. 4 and FIG. 6), from the second console. Responsive to the fourth message, the first console (e.g., the adjustment of parameters 670 in FIG. 6) may update the first plurality of parameters and the first schedule based on the second message and the fourth message. The first console may access the shared wireless channel using the further updated first plurality of parameters according to the further updated first schedule (e.g., after performing the adjustment of parameters 670, AP1 may access the shared wireless channel).

In some implementations, the first console may receive a fourth message (e.g., the management frame 624 in FIG. 6) including a third schedule for access to the shared wireless channel by the second console, from the second console. The third schedule may be compatible with the updated first schedule. Responsive to the fourth message, the shared wireless channel may be accessed by the first console according to the updated first schedule (e.g., if the management frame 624 confirms that the updated schedule of AP2 is compatible with the last updated schedule of AP1 indicated by the management frame 614, AP1 may access the shared wireless channel without performing the adjustment of parameters 670).

In some implementations, the first console may send the third message (e.g., the management frame 614 in FIG. 6) including the updated first plurality of parameters and the updated first schedule, to at least one of the second console (e.g., AP2 in FIG. 4 and FIG. 6) or a third console (e.g., AP3 in FIG. 4 and FIG. 6).

In some implementations, the first console may detect, determine and/or measure an interference (e.g., traffic schedule conflict or quality of wireless signal) during the first schedule (e.g., a time window of the shared channel specified in the schedule field 540 in FIG. 5) by. According to the measured interference, the first console may update the first plurality of parameters (e.g., channel parameters specified in the parameters fields 550 in FIG. 5) and the first schedule. The first console may send the third message including the updated first plurality of parameters and the updated first schedule.

In some implementations, at least one of the first message (e.g., the update message 812 in FIG. 8), the second message (e.g., the update message 822 in FIG. 8) or the third message (e.g., the update message 814 in FIG. 8) may be communicated between the first device (e.g., AP4 in FIG. 8) and the second device (e.g., AP5 in FIG. 8) via out-of-band signaling (e.g., the out-of-band signaling 740 in FIG. 7) or via a database e.g., the database 770 in FIG. 7 and FIG. 8).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:
   receiving, by a first console executing an application for artificial reality from a second console, a first message comprising a first plurality of parameters and a first schedule for access to a shared wireless channel by the second console;
   sending, by the first console to the second console, a second message comprising a second plurality of parameters and a second schedule for access to the shared wireless channel by the first console, wherein the first plurality of parameters and the first schedule are updated at the second console responsive to the second message; and
   receiving, by the first console, a third message comprising the updated first plurality of parameters and the updated first schedule.

2. The method of claim 1, wherein the first schedule indicates a plurality of time windows for accessing the shared wireless channel to transmit data of the artificial reality.

3. The method of claim 1, further comprising:
   sending, by the first console to the second console, a fourth message comprising a plurality of parameters and a schedule for access to the shared wireless channel by the first console,
   wherein the first plurality of parameters and the first schedule are updated at the second console based on the second message and the fourth message.

4. The method of claim 1, wherein the first message further comprises a service level of the second console or the application for artificial reality.

5. The method of claim 1, wherein the first plurality of parameters and the first schedule are updated at the second console according to an interference measured during the first schedule.

6. The method of claim 1, wherein each of the first message, the second message, and the third message is a management frame.

7. The method of claim 1, wherein the parameters for access to the shared wireless channel include at least one of a transmission rate, a transmission frequency, enhanced distributed channel access (EDCA) parameters, a Quality of service (QoS), beam polarization, a transmission power level, transmission duration limit, or a space dimension for beamforming.

8. The method of claim 1, wherein at least one of the first message, the second message or the third message is communicated between the first device and the second device via out-of-band signaling or via a database.

9. The method of claim 1, further comprising:
   sending, by the first console to the second console, a fourth message comprising a third schedule for access to the shared wireless channel by the first console, the third schedule being compatible with the updated first schedule.

10. The method of claim 1, comprising:
    receiving, by the first console, the third message comprising the updated first plurality of parameters and the updated first schedule.

11. A system as a first console for executing an application for artificial reality, comprising:
    a wireless communication interface; and
    a processor configured to:
    receive, via the wireless communication interface from a second console, a first message comprising a first plurality of parameters and a first schedule for access to a shared wireless channel by the second console;
    send, to the second console via the wireless communication interface, a second message comprising a second plurality of parameters and a second schedule for access to the shared wireless channel by the first console;
    receive, via the wireless communication interface from the second console, a third message comprising a third plurality of parameters and a third schedule; and
    update, responsive to the third message, the second plurality of parameters and the second schedule.

12. The system of claim 11, wherein the first schedule indicates a plurality of time windows for accessing the shared wireless channel to transmit data of the artificial reality.

13. The system of claim 11, wherein the processor is further configured to:
    send, to the second console via the wireless communication interface, a fourth message comprising a plurality of parameters and a schedule for access to the shared wireless channel by the first console, wherein
    responsive to the fourth message, the second console further updates the first plurality of parameters and the first schedule based on the second message and the fourth message, and accesses, via the wireless communication interface, the shared wireless channel using the further updated first plurality of parameters according to the further updated first schedule.

14. The system of claim 11, wherein the first message further comprises a service level of the second console or the application for artificial reality.

15. The system of claim 11, wherein the processor is further configured to:
    receive, from the second console via the wireless communication interface, the third message comprising an updated first plurality of parameters and an updated first schedule, which have been updated by the second console according to a result of measuring an interference during the first schedule.

16. The system of claim 11, wherein each of the first message, the second message, and the third message is a management frame.

17. The system of claim 11, wherein the parameters for access to the shared wireless channel include at least one of a transmission rate, a transmission frequency, enhanced distributed channel access (EDCA) parameters, a Quality of service (QoS), beam polarization, a transmission power level, transmission duration limit, or a space dimension for beamforming.

18. The system of claim 11, wherein at least one of the first message, the second message or the third message is communicated between the first device and the second device via out-of-band signaling or via a database.

19. The system of claim 11, wherein the processor is further configured to:
send, to the second console via the wireless communication interface, a fourth message comprising a third schedule for access to the shared wireless channel by the first console, the third schedule being compatible with the updated first schedule,
wherein responsive to the fourth message, the second console accesses, via the wireless communication interface, the shared wireless channel according to the updated first schedule.

20. The system of claim 11, wherein the processor is further configured to:
receive, from the second console, the third message comprising the updated first plurality of parameters and the updated first schedule.

\* \* \* \* \*